Figure 1:
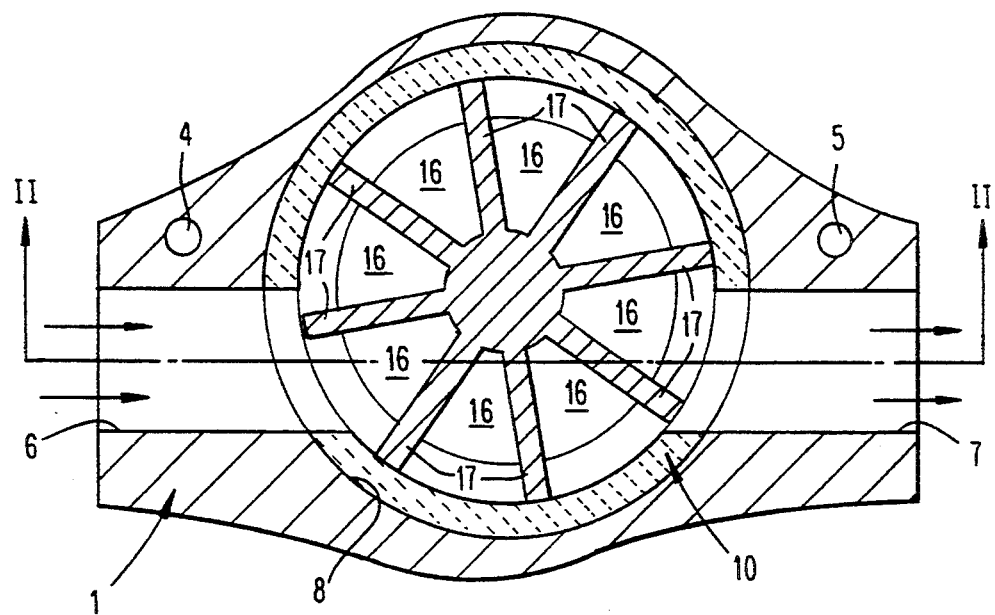

United States Patent [19]

Ostertag et al.

[11] Patent Number: 5,409,034
[45] Date of Patent: Apr. 25, 1995

[54] ELECTRICALLY ACTUATED VALVE FOR A PRESSURIZED FLUID

[75] Inventors: Ulrich Ostertag; Reinhard Ostertag, both of Stuttgart, Germany

[73] Assignee: Hansa Metallwerke AG, Stuttgart, Germany

[21] Appl. No.: 199,271

[22] PCT Filed: Aug. 12, 1992

[86] PCT No.: PCT/EP92/01840
§ 371 Date: Feb. 28, 1994
§ 102(e) Date: Feb. 28, 1994

[87] PCT Pub. No.: WO93/05327
PCT Pub. Date: Mar. 18, 1993

[30] Foreign Application Priority Data

Sep. 1, 1991 [DE] Germany .................. 41 28 889.0

[51] Int. Cl.⁶ .................................................. G05D 7/06
[52] U.S. Cl. ........................... 137/499; 192/21.5; 192/58 A; 251/59; 414/219; 137/625.32
[58] Field of Search ............. 137/499, 909; 251/58, 251/59; 414/219; 464/24, 25, 28, 29; 192/21.5, 58 A

[56] References Cited

U.S. PATENT DOCUMENTS

| | | | |
|---|---|---|---|
| 1,311,202 | 7/1919 | Anderson | 137/499 X |
| 1,482,547 | 2/1924 | Dell | 137/499 X |
| 3,068,891 | 12/1962 | Panning et al. | 137/499 |
| 3,101,853 | 8/1963 | Long et al. | 414/219 X |
| 3,279,496 | 10/1966 | Klass et al. | 137/499 X |
| 4,180,188 | 12/1979 | Aonuma et al. | 414/219 X |
| 4,896,754 | 1/1990 | Carlson et al. | 464/29 X |
| 5,241,991 | 9/1993 | Iorio et al. | 137/625.32 X |

*Primary Examiner*—Stephen M. Hepperle
*Attorney, Agent, or Firm*—Lowe, Price, LeBlanc & Becker

[57] ABSTRACT

An electrically actuated valve for control of a pressurized fluid, particularly a sanitary valve, comprises a rotor (15) arranged in a housing (1) between an inlet passageway (6) and an outlet passageway (7). The rotor (15) is rotatable under the action of the pressurized fluid and transports portions of the fluid from the inlet passageway (6) to the outlet passageway (7). There is an operational connection between the rotor (15) and an element (19) rotatably arranged in a chamber (21) filled with an electro-viscous liquid (22). The electro-viscous liquid (22) is arranged between two electrodes (23, 24) to which as high voltage (25) can be applied. In one embodiment of the invention the rotor (15) also forms the closure element of the valve, which is braked to a various extent by the rotatable element (19) arranged in the electro-viscous liquid. In a further embodiment rotation of the rotor will supplied to a closure member via the rotatable element, which will then be an element of a clutch, and gear means.

21 Claims, 2 Drawing Sheets

ELECTRICALLY ACTUATED VALVE FOR A PRESSURIZED FLUID

The invention relates to an electrically actuated valve for a pressurized fluid, particularly a sanitary valve, comprising a) a housing including an inlet passageway and an outlet passageway for the fluid;

b) a closure member arranged in the housing between the inlet passageway and the outlet passageway;

c) electrical operating means for positioning the closure member in an opening position or a closing position in accordance with a control voltage supplied thereto.

Known electrically actuated valves generally are electrically operated solenoid valves. This means that they comprise a current energized coil, which in the simplest case directly controls the closure member magnetically. However, the electric currents are that important that this simple structure cannot be used for many applications. Thus normally pilot-controlled electro-magnetic valves are used, wherein the current energized coil controls a pilot valve, only, the fluidically active cross section of which is comparatively small. The control member is formed by a flexible diaphragm, which in accordance with the opened or closed state of the pilot valve arranged therein will perform an opening or closing movement under control of the pressure of the fluid to be controlled. However, even such valves have a comparatively large power requirement so that there are restrictions for battery-energized applications. Furthermore, the comparatively small cross sections of the pilot valves, in particular the pilot openings in the flexible diaphragms can easily get clogged. This is especially true, if the controlled fluid is hot water, calcareous deposits risking being formed in such water. Furthermore, the magnet coil is a costly and voluminous component. Diaphragms are prone to ageing and getting brittle.

The object of the present invention is to provide an electrically operated valve of the kind referred to above, which can be built from low-cost components, which is compact and consumes little energy, only.

In accordance with a first aspect of the invention this object is solved by the additional features that the closure member is formed as a rotor sealingly cooperating with the housing and arranged in the fluid path between the inlet passageway and the outlet passageway, said rotor being rotatable under the pressure of the fluid and upon rotation transports portions of said fluid from the inlet passageway to the outlet passageway; the electrical actuating means is formed as a brake coupled to the rotor and controlling its ability to rotate, the brake having an electrically controlled medium formed by an electro-viscous liquid arranged between two electrodes.

Electro-viscous liquids are know per se. Examples of such liquids are described in EP-A-0 191 585, DE-A-35 36 934 or EP-A-0 319 201. Electro-viscous liquids are materials, the viscosity of which can be continously varied by applying electric fields between a "liquid" state and a "solid" state. The main application of such liquids has mainly been variable hydraulic damping of movements of various components in automotive constructions, e.g. hydraulic engine bearings disclosed in DE-C-33 36 965 or hydraulic vibrations dampers as taught by DE-C-37 09 447.

In accordance with the first aspect of the invention the electro-viscous liquid is used in a brake controlled by a control voltage supplied thereto, which brake controls the moveability of a rotor defining the flow rate of the fluid: if the viscosity is low, the rotor is practically free to rotate under the influence of the fluid flowing through the valve, so that a maximum fluid rate is established. If the control voltage is increased and the viscosity of the electro-viscous liquid is thus increased, the brake starts to become active. Rotation of the rotor will be reduced, which will result in corresponding reduction of the flow of fluid through the valve. The control voltage may be increased until such value, where the electro-viscous liquid of the brake is essentially rigid. The rotor is then completely blocked against rotation. Considering ideal seal conditions between the rotor and the housing, the valve is then closed.

It is to be noted that the structure of such a valve is very simple; there are no expensive and voluminous coils. The power requirements are comparatively small, and no "peak currents" are required during switching cycles. The small currents required for maintaining the high viscosity rigid state of the electro-viscous liquid can easily be provided by solar cells. In such case only comparatively small batteries are required for intermediate storage of electric energy. The work required for closing the valve is not done by supplied electric energy but exclusively derived from the pressure of the fluid to be controlled. The cross section of passages conducting the fluid within the valve can be chosen very large so that there is no undesired restriction effect and there are no narrow cross sections which are likely to get clogged.

In a preferred such embodiment the brake comprises a brake wheel, which is rotatably arranged in a brake chamber filled with the electro-viscous liquid, said brake wheel being coupled to the rotor.

Advantageously the brake wheel is arranged coaxial to the rotor an connected thereto by means of a positive plug-in connection.

The rotor may have a circumferencial surface formed with a plurality of depressed pockets to transport portions of the fluid. Sealing of the rotor with respect to the housing is achieved in this embodiment by the outward faces of separating walls located between the depressed pockets.

If the rotor is of frustoconoical shape, sealing thereof with respect to the housing is facilitated, since tolerances of its diameter can be compensated by axial movement of the rotor.

In accordance with a further feature of the invention at least portion of the rotor defining the circumferential surface thereof is made from hard material, e.g. ceramic material. Such ceramic material is already widely and often used in connection with control discs of sanitary valves. Ceramic material combines good sealing and sliding properties with high wear resistance.

It is also advantageous to seal the rotor with respect to the housing by means of stationary insert member arranged in the housing and sealingly engaging the circumferential surface of the rotor.

Again, at least the portion of the insert member being close to the rotor can be made from hard material, e.g. ceramic material.

In view of warranting reliable closing of the valve even upon eventual failure of the supply of electric energy or during very long non-operational periods, a manually operable latch means is preferred, which blocks the ability of the rotor to rotate independent of the electro-viscous brake.

This latch means may comprise an axially moveable pin, which can be introduced into a corresponding opening of the rotor for providing a torque transmitting connection. The axially movable pin in turn may be fixed in a non-operating position and a latching position, respectively, by snap action.

The first aspect of the invention referred to in claim 1 and discussed above is characterized by a particularly simple overall structure. However in some cases some extent of diligence is required to warrant sealing of the rotor with respect to the housing. Such may be renounced to in all cases, where it is not necessary that the valve has a closed state being free from dripping.

A second embodiment of the invention also solving the technical object referred to above presents no difficulty as to obtaining a closed state of the valve being free from dripping. This embodiment is characterized in that d) the fluid path extending between the inlet passageway and the outlet passageway is provided with a rotor being rotatable under the pressure of the fluid;

e) gear means are provided deriving from the rotary motion of the rotor a control movement of the closure member for moving the latter between the open position and the closed position, respectively;

f) the actuating means is formed by an electro-viscous clutch arranged in the force transmitting path extending between the rotor and the closure element, which clutch contains an electrically controlled medium formed by an electro-viscous liquid being located between electrodes.

In this embodiment the rotor does not also form the closure member but is used solely as a drive means, which moves the closure element between its open and closed positions via gear means. To this end complete sealing of the rotor with respect of the housing of the valve is not necessary. It is sufficient, if the fluid flowing through the valve will effectively impart a rotational movement to the rotor. The amount of fluid flow is determined by the position of a separate closure member, which generally can be of any known type. The "switching state" of the electro-viscous clutch arranged in the force transmitting path extending between the rotor and the closure member will determine, if the rotor will turn "idle", i.e. its rotation will have no influence onto the position of the closure member, or the rotation of the rotor will result in a change of the position of the closure member. The advantages obtained with this second embodiment of the invention apart from this fact generally correspond to the ones already mentioned in connection with the first embodiment.

It is preferred that the closure member is biased in the valve opening direction by means of a force storing element, e.g. spring means. Moving of the closure member towards the closed state thereof is thus obtained by rotation of the rotor, the electro-viscous clutch being "engaged". Contrarily, the force storing element will move the closure member back in the open state after the electro-viscous clutch has been "disengaged".

It is particulary advantageous, if the closure member is formed by a rotatable disc and the force storing element is formed by a spiral spring.

Generally provisions should be made to avoid rotation of the rotor in one sense of rotation. This means that conditions are to be avoided, wherein the action of the spring means will provide for transmission of a force in "backward" direction, which might result in rotation of the rotor in a sense opposite to the one in which it is rotated by the pressurized fluid.

The means exluding rotation of the rotor in said one sense of rotation may be formed by the gear means itself, which due to its transmission ratio will impede the spring means to rotate the rotor in backward direction. Normally the gear means will have to significantly reduce the rotation of the rotor so that a plurality of rotations of the rotor corresponds to the overall travel of the closure member between its closing position and its open position. In such case generally the force provided by the sping means and acting on the output shaft of the gear means will not be sufficient to impart movement to the rotor.

In an alternative embodiment said means excluding rotation of the rotor in said one sense of rotation can also be formed by a one-way clutch being a structural component know per se.

The electro-viscous coupling should be arranged in the force transmitting path between the gear means and the closure member. In such case the relative movement between the input part and the output part of this clutch shows only comparatively small overall travel, particularly a comparatively small change in the angular position which is advantageous in view of cables supplying electric energy.

The electro-viscous clutch may comprise a clutch wheel rotatably arranged in a clutch chamber of the clutch housing filled with the electro-viscous liquid.

It is preferred that the cross section of the clutch chamber has a profile being different from a circle. This provides for positive locking, particularly when the electro-viscous liquid is in its rigid state.

For the reasons already explained above also in the second embodiment of the invention manually operable latch means should be provided to secure the closure member against movement thereof.

Figure 2:
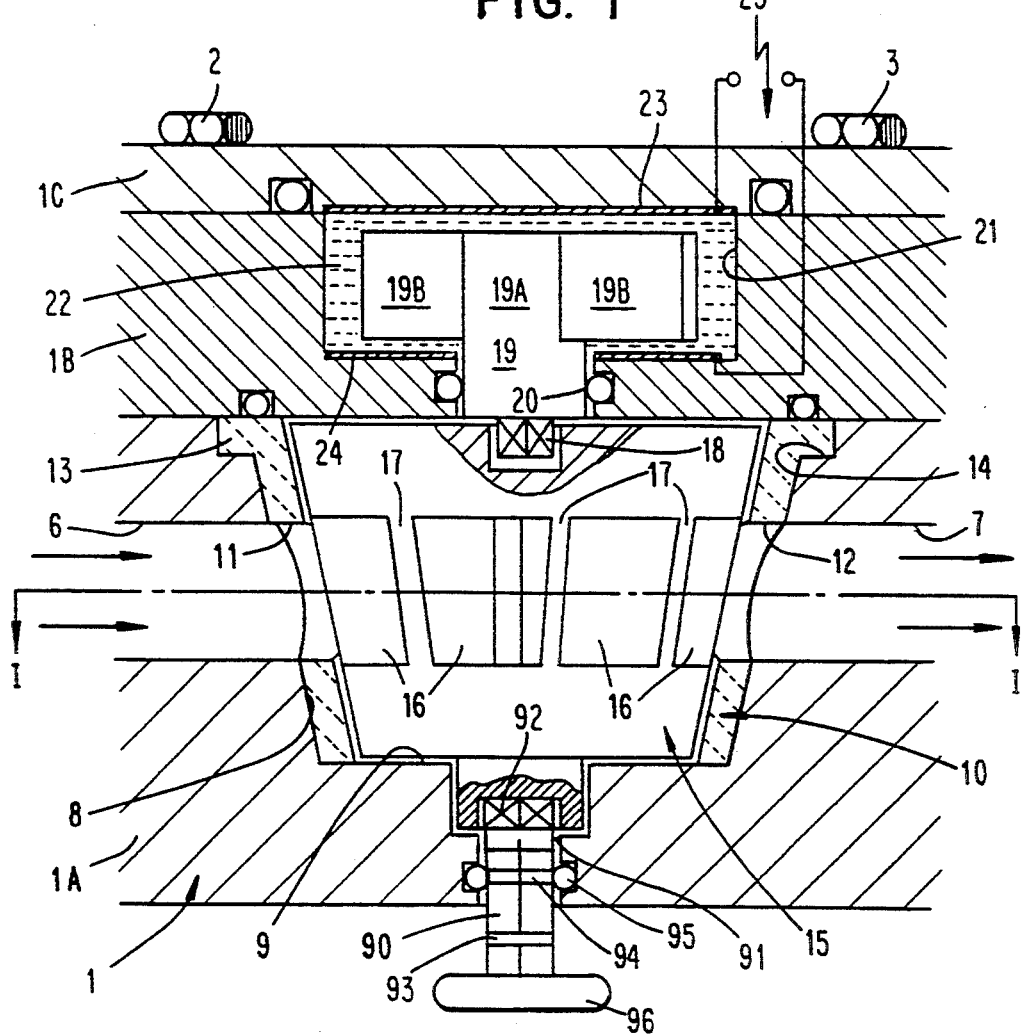
Figure 3:
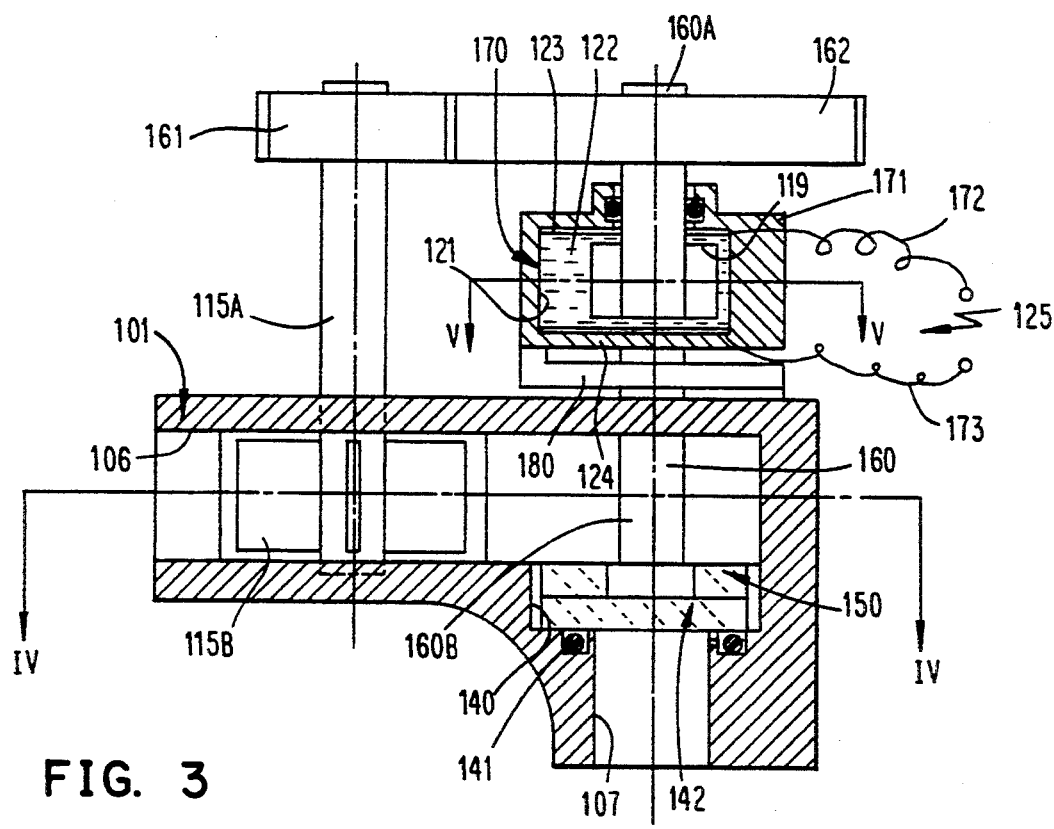
Figure 4:
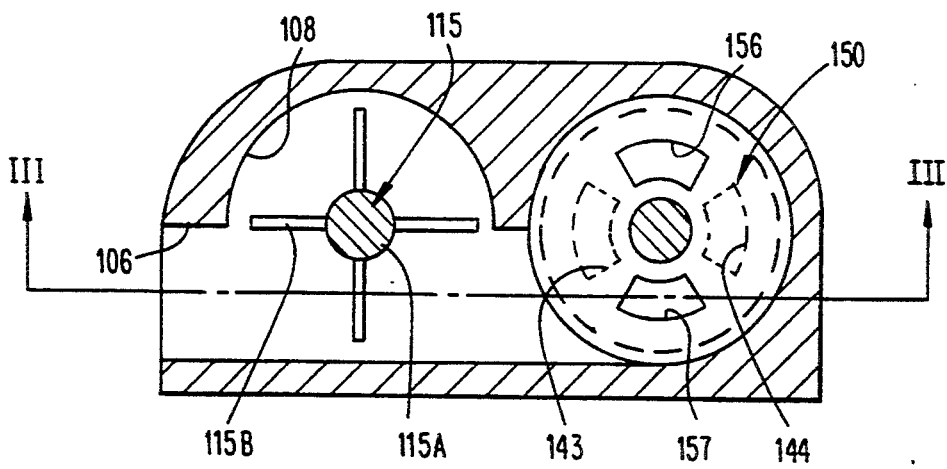
Figure 5:
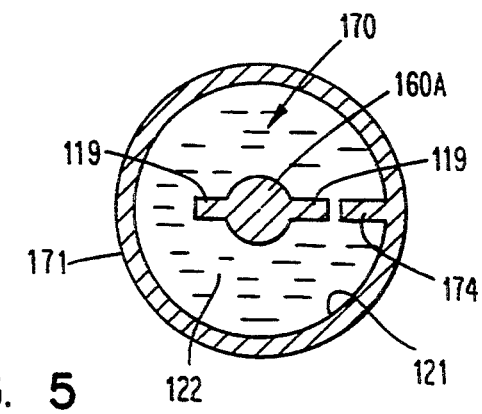

Practical embodiments of the invention will now be explained in more detail referring to the drawings. Therein FIG. 1: is a section through a first embodiment of a valve controlling flow of a pressurized fluid, the section being along line I—I of FIG. 2 (the rotor being not cut);

FIG. 2: is a section through the valve of FIG. 1 along line II—II;

FIG. 3: is a section through a second embodiment of a valve, the section being along line III—III of FIG. 4 (a rotor, gear means and a brake wheel being not cut);

FIG. 4: is a section of the valve shown in FIG. 3 along line IV-IV;

FIG. 5: is a section through an electro-viscous clutch of the valve shown in FIG. 3, the section being along line V—V.

The valve shown in FIGS. 1 and 2 is suited to control the flow rate of a pressurized fluid, particularly water, in continuous manner throughout the range between the completely closed state and a state of maximum flow rate. The valve has a housing 1, which is split into three housing segments 1a, 1b, 1c. The housing segments are connected by means of screws 2, 3 extending through bores 4, 5 provided in all the housing segments 1a, 1b, 1c.

In the housing segment 1a of the housing 1 an inlet passageway 6 has been provided receiving pressurized fluid. Coaxially thereto there is an outlet passageway 7. Between the inlet passageway 6 and the outlet-passageway 7 a rotor chamber 8 is formed in the housing being displaced from the axis of the two passageways 6, 7, thus being eccentric. The rotor chamber 8 is of frustoconical shape, i.e. it is of circular cross section, the section diminishing from the upper end face of the housing segment 1a towards a bottom 9. The circumferential surface of the rotor chamber 8 is clad by an insert member 10 made from ceramic material. The interior surface thereof is polished meeting high standard so that it can be used as a sealing surface.

The insert member 10 is formed with through openings 11, 12 being coaxial to the passageways 6 and 7 and having the same diameter as the latter.

At its upper end (as seen in FIG. 2) the insert member 10 is formed with a radially projecting annular flange 13 resting on a shoulder 14 of the housing segment 1a.

Within the rotor chamber 8 a complementarily shaped, i.e. also frustoconical rotor 15 is rotatably arranged. The rotor 15 is entirely made from ceramic material, or at least its exterior portion is made of from ceramic material. Its circumferential surface engaging the interior circumferential surface of the insert member 10 is polished to sealing quality. Due to the conical shape of the engaging circumferential surfaces of the insert member 10 and the rotor 15, these two components can be easily sealed with respect to another.

The rotor 15 comprises a plurality of chambers 16 being separated by narrow essentially radially extending separating walls 17.

At the upper end face of the rotor 15 a force transmitting positive drive connection 18 is provided to couple the rotor to a coaxial brake wheel 19. The brake wheel 19 comprises a hub portion 19a, sealingly extending through a coaxial bore 20 of the housing segment 1b.

The bore 20 merges into a brake chamber 21 being open towards the upper end face of the housing segment 1b. The brake chamber 21 is filled with an electro-viscous liquid 22.

Vanes 19b are formed integral with the hub portion 19a of the break wheel 19, which vanes are moved in the electro-viscous liquid 22, if the break wheel 19 is rotated.

The upper end of the brake chamber 21 is closed in upward direction by means of the third housing segment 1c.

Metallic electrodes 23, 24 overlie the upper end face of the brake chamber 21 defined by the housing segment 1c and the lower anular end face defined by the housing segment 1b, respectively. The electrodes 23, 24 are connected to a high voltage supply 25. The voltage provided by the high voltage supply 25, which may be a DC-voltage source or an AC-voltage source, can be continuously adjusted between a lower value, particularly the value zero, resulting in a liquid state of the electro-viscous liquid 22 and a maximum value, wherein the electro-viscous liquid 22 will assume its rigid state.

The valve described above operates as follows:

As long as the voltage provided by the high voltage supply 25 is set to its lower value and the electro-viscous liquid 22 contained in the brake chamber 21 is in its liquid state, there is unimpeded rotation of the rotor 15 within the rotor chamber 8. Thus there is essentially unrestricted flow of pressurized fluid through the inlet passageway 6, the rotor chamber 8 and the outlet passageway 7, such flow of fluid imparting rotational movement to the rotor 15. Transport of the fluid from the inlet passageway 6 to the outlet passageway 7 is carried out in "portions" each of which is contained in one of the different pockets 16 formed in the rotor 15. In view of reducing frictional forces opposing rotation of the rotor 15 all surfaces by which the rotor 15 engages stationary parts, particularly the insert member 10, are chosen as small as possible and are lubricated, if desired.

If a reduction in the flow of water is desired, the voltage provided by the high voltage supply 25 is increased. This results in an increase of the viscosity of the electro-viscous liquid 22 contained in the brake chamber 21 thus providing increased resistance to movement of the vanes 19b of the brake wheel 19. Thus a breaking action is obtained depending on the viscosity of the electro-viscous liquid 22. The amount of fluid flowing through the valve is now determined by the braking action of the brake wheel 19 and the pressure of the fluid.

If fluid flow through the valve is to be completely shut off, the voltage provided by the high voltage supply 25 is increased to an extent sufficient to obtain a completely rigid state of the electro-viscous liquid contained in the brake chamber 22. This results in complete standstill of the vanes 19b of the brake wheel 19 arranged in the brake chamber 21. Consequently there is no further movement of the rotor 15 arranged in the rotor chamber 8. Due to provision of the separating walls 17 of the rotor 15 being located between the various pockets 16, some of which always engage the insert member 10, the fluid path of the inlet passageway 6 and the outlet passageway 7 is interrupted, the valve thus being closed.

The lower portion of FIG. 2 shows means for independent closing of the valve in cases where there is failure of the high voltage supply or it is desired to close the valve for long periods. These means comprise a manually operated control pin 90 having a poligonal end portion and extending through a through opening 91 of complementary cross section formed in the housing 1. The end portion of the control pin 90 can be introduced into a correspondingly poligonal recess 92 formed in the lower end face of the rotor 15 thus rendering impossible rotation of the rotor 15. Two circumferential grooves 93, 94 are provided in the control pin 90, which cooperate with an O-ring 95 in view of latching the control pin 90 in its latching position and in a non-operational position shown in the drawings, respectively. The outward end of the control pin 90 carries a handle 96.

FIGS. 3 through 5 show a second embodiment of a valve for controlling the flow of a pressurized fluid. This embodiment also comprises a housing 101 formed with an inlet passageway 106 and an outlet passageway 107 the latter extending in a direction perpendicular to the axis to the inlet passageway. The inlet passageway 106 merges into a rotor chamber 108 in a similar way as in the embodiment shown in FIGS. 1 and 2. In contrast thereto the rotor chamber 108 is of cylindrical shape, i.e. has a cross section being constant along the axial extention of the rotor chamber. The rotor chamber 108 again is offset from the axis of the inlet passageway 106. In the embodiment shown the horizontal section of the rotor chamber is formed as a semi-circular widening of the inlet passageway as shown in the horizontal section of FIG. 4.

A rotor 115 is rotatably arranged in the rotor chamber 108. It has a hub portion 115a and pluarlity of radial vanes 115b. The rotor vanes 115b need not sealingly engage the interior surface of the rotor chamber 108. There may even be a gap between these components, the only requirement being that this gap be so small that the rotor 115 will be rotated by the fluid discharged from the inlet passageway 106.

A coaxial extension of the inlet passageway 106 extends between the rotor chamber 108 and a recess 140 surrounding the outlet passageway 107, the recess 140 being of circular geometry as seen in axial direction and as shown in the horizontal section of FIG. 4. A first control disk 142 is inserted into the recess 140, an O-ring 141 being arranged therebetween. Thus the first control disk 142 cannot be rotated with respect to the housing 101. The first control disk 142 has two through openings 143, 144 (shown in dashed lines in FIG. 4) which extend from the upper circular end face of the first control disk to its lower circular end face. The upwardly facing end face of the first control disk 142 is polished to high quality so that it will form a sealing surface.

A second, also circular control disk 150 is arranged on the first control disk 142 and can be rotated with respect to the first, stationary control disk by means of a split drive shaft 160 in a manner to be described in more detail below. The second control disk 150 also comprises two through openings 156, 157 which by rotation of the second control disk 150 may be set into different positions, wherein a major or lesser extent of overlap of its through openings and the through openings 143 and 144 of the first control disk are obtained.

Rotation of the second control disk 150 with respect to the first control disk 142 is obtained by means of the rotor 115 as follows:

As has been shown in FIG. 3, the hub portion 115a of the rotor 115 projects beyond the housing 101, of course seal means being provided. The outward end of the hub portion 115a carries a first gear 161 of comparatively small diameter. The latter cooperates with a second gear 162 of larger diameter carried by the outward portion 160a of the split drive shaft 160 associated to the second control disk 150. The outward portion 160a of the drive shaft 160 is connected to an inward portion 160b thereof by means of an electro-viscous clutch generally shown at 170. The electro-viscous clutch 170 comprises a housing 171 being formed with a clutch chamber 121 being filled with an electro-viscous liquid 122. The housing 171 is coaxial to the interior portion 160b of the drive shaft 160 and rigidly connected thereto, so that these two parts always rotate together.

The exterior portion 160a of the drive shaft 160 sealingly extends through a bore provided in the upper end wall of the housing 171 (as seen in FIG. 3). The portion thereof being within the clutch chamber 121 carries a clutch wheel 119 including outwardly extending vanes moving through the electro-viscous liquid 122 more or less freely.

Metallic electrodes 123 and 124 are again provided at the upper and lower surfaces of the clutch chamber 121, which electrodes are connected to a high voltage supply 125 by means of flexible cables 172, 173.

As shown in FIG. 5, a stationary web of material 174 radially projects into the clutch chamber 121 in inward direction. By provision thereof the transmission of force between the driving and driven members of the clutch is improved.

The lower end face of the housing 171 of the electro-viscous clutch 170 is connected to the exterior surface of the housing 101 of the valve by means of a spiral spring 180 in such manner that the housing 171 of the clutch 170 and the interior portion 160b of the drive shaft 160 and thus the second control disk 150 are biased towards the open position of the valve. Thus the second control disk 150 normally or in a no-pressure state, where there is no supply of fluid, is in its open position (in contrast thereto, FIG. 4 shows the closing position of the valve).

The valve described above operates as follows:

To begin with, the transition from the completely open state to the completely closed state of the valve will be described. In the open position of the valve the voltage output from the high voltage supply 125 has its lowest operating value, particularly the value zero. This results in the electro-viscous liquid 122 contained in the clutch chamber 121 assuming its liquid state. While the fluid flowing through the inlet passageway 106 will impart rotational movement to the rotor 115, and such rotation will be transferred to the exterior portion 160a of the drive shaft 160 through the hub portion 115a of the rotor and the gears 161 and 162, the interior portion 160b of the drive shaft 160 will be mechanically separated from the exterior portion 160a thereof, since the vanes 119 formed integral with the exterior portion 160a of the drive shaft 160 move essentially freely in the electro-viscous liquid 122. Thus there is no appreciable transfer of torque by these vanes 119 to the housing 171. Consequently the fluid can flow through the passageway 106 and the aligned through openings 156, 157, 146, 147 of the control disks 142, 150 thus reaching the outlet passageway 107.

If closing of the valve is desired, the high voltage supply 125 is set to its highest operating voltage, which will result in the electro-viscous liquid 122 contained in the coupling chamber 121 assuming its rigid state. Now a force transmitting path is established between the exterior portion 160a and the interior portion 160b of the drive shaft 160. Rotation of the rotor 115 is thus transferred to the second control disk 150, and the latter will be rotated overcoming the bias of the spiral spring 180 until its closing position is reached, which is defined by abutment means. The closing movement of the moveable control disk 150 will be slower in the final portion of the overall travel, since the current of fluid flowing through the valve will be increasingly smaller so that rotation of the rotor 115 will also be increasingly slower. Such effect is desired since thus pressure surges are safely avoided, which are encountered in prior art solenoid operated valves, when the latter close. With a valve of the type described above the flow of fluid thus cuts itself.

When designing the transmission formed by the gears 161 and 162 care is taken to obtain self-locking characteristics which will exclude that the spiral spring 180 will rotate the rotor 115 in the opposite direction, when the electro-viscous liquid 122 is in its rigid state, which in turn would cause moving of the second control disk in the valve opening direction.

Alternatively this undesired backward movement of the rotor 115 can be avoided by provision of a one-way clutch of any known type.

If the valve is to be opened again, the voltage provided by the high voltage supply is reduced to again correspond to the first, lowest operating value. Thus the force transmitting path between the exterior portion 160a and the interior portion 160b of the drive shaft 160 is interrupted. Under the action of the spiral spring 180 the moveable control disk 150 will now be rotated back into the open position. Thus a free fluid path extending between the inlet passageway 106 and the outlet passageway 107 is reestablished.

With the valve described above there may be also established intermediate open states being between the fully closed position and the completely open position of the valve by suitable selection of intermediate values of the voltage provided by the high voltage supply 125.

If a voltage is applied to the electrodes 123 and 124, which will cause an increase in the viscosity of the electro-viscous liquid 122, the latter however not yet assuming its rigid state, the vanes 119 rotating in the electro-viscous liquid will transfer a predetermined torque to the housing 171 of the electro-viscous clutch 170 being dependent on the viscosity, the torque transfer being through shear forces. Under such torque the housing 171 of clutch 170 and thus the second control disk 150 are rotated by a given amount until the spiral spring 180 has been tensioned to an extent, wherein the torque provided by the spring is exactly equal to the torque provided by the shear forces, the direction of these two torques being opposite. By continuously increasing the voltage provided by the high voltage supply 125 every desired intermediate position of the valve between its completely open and its fully closed position may be established under the counteracting contributions of the viscosity dependent shear forces and the angle dependent action of the spiral spring 180. Of course the embodiment shown in FIGS. 3 to 5 may also be equipped with safety means excluding undesired movement of the moveable control disk 150 in backward or valve opening position upon failure or switching off of the high voltage supply 125.

The electric currents required for maintaining the rigid state of the electro-viscous liquid are very small as already pointed out above. Thus the high voltage supply may be chosen as a high resistance voltage supply so that any danger to users is reliable excluded even in use of the valve for sanitary purposes.

In the described embodiments of electrically actuated valves the energy required for completely closing the valve is entirely derived from the pressure of the flowing fluid. Electric energy will solely used to the very small extent necessary for maintaining the viscous state of the electro-viscous liquid. Since modern electro-viscous liquids expose very small electric conductivity, only, and since the volumes of liquid used can be kept very small, the electric power requirements of these valves are extremely low. Thus these valves are particularly suited for use with batteries, eventually having solar charging units associated thereto. Furthermore all fluid paths can be generously dimensioned, since no pilot openings are required.

We claim:

1. Electrically actuated valve for a pressurized fluid, particularly a sanitary valve, comprising
   a) a housing including an inlet passageway and an outlet passageway for the fluid;
   b) a closure member arranged in the housing between the inlet passageway and the outlet passageway;
   c) electrical operating means for positioning the closure member in an opening position or a closing position in accordance with a control voltage supplied thereto,
   characterized in that
   d) the closure member is formed as a rotor (15) sealingly cooperating with the housing (1) and arranged in the fluid path between the inlet passageway (6) and the outlet passageway (7), said rotor being rotatable under the pressure of the fluid and upon rotation transporting portions of said fluid from the inlet passageway (6) to the outlet passageway (7);
   e) the electrical actuating means is formed as a brake (19, 21, 22) coupled to the rotor (15) and controlling its ability to rotate, the brake (19, 21, 22) having an electrically controlled medium formed by an electro-viscous liquid (22) arranged between two electrodes (23, 24).

2. Electrically actuated valve in accordance with claim 1, characterized in that the brake (19, 21, 22) comprises a brake wheel (19) rotatably arranged in a brake chamber (21) containing the electro-viscous liquid (22) and being coupled to the rotor (15).

3. Electrically actuated valve in accordance with claim 2, characterized in that the brake wheel (19) is arranged coaxial to the rotor (15) and is connected to the rotor (15) by means of a positive torque transmitting plug-in connection (18).

4. Electrically actuated valve in accordance with claim 1, characterized in that the circumferential surface of the rotor (15) is formed with a plurality of depressed pockets (16) to transportions of the fluid.

5. Electrically actuated valve as in claim 1, characterized in that the rotor (15) is of frustoconical geometry.

6. Electrically actuated valve as in claim 1, characterized in that at least the portion of the rotor (15) defining the circumferential surface thereof is made from ceramic material.

7. Electrically actuated valve as in claim 1, characterized in that the rotor (15) is sealed with respect to the housing (1) by means of a stationary insert member (10) arranged in the housing (1) and cooperating with the circumferential surface of the rotor (15) under sealing slide conditions.

8. Electrically actuated valve as in claim 7, characterized in that at least a portion of the insert member (10) being adjacent to the rotor (15) is made from ceramic material.

9. Electrically actuated valve as in claim 1, characterized by manually operable latch means (90, 92) for latching the rotor (15) against rotation independent of operation of the electric brake (19, 21, 22).

10. Electrically actuated valve as in claim 9, characterized in that the latching means comprises an axially movable pin (90) adapted to positively engage in a corresponding opening (92) formed in the rotor (15).

11. Electrically actuated valve as in claim 10, characterized in that the axially movable pin (90) can be fixed in a non-operating position and the latching position by snap action, respectively.

12. Electrically actuated valve for a pressurized fluid, particularly a sanitary valve, comprising
   a) a housing including an inlet passageway and an outlet passageway for the fluid;
   b) a closure member arranged in the housing between the inlet passageway and the outlet passageway;
   c) electrical actuating means for positioning the closure member in an opening position or a closing position in accordance with a control voltage supplied thereto,
   characterized in that
   d) a rotor (115) is arranged in the fluid path extending between the inlet passageway (106) and the outlet passageway (107) which is rotatable under the pressure of the fluid;
   e) gear means (161, 162) are provided to derive from the rotary motion of the rotor (115) a control motion of closure member (150) so has to move the latter between an opening position and a closing position;

f) the actuating means comprises an electro-viscous clutch (170) arranged in the force transmitting path extending between the rotor (115) and the closure member (150) including an electrically actuated medium formed by an electro-viscous liquid (122) being arranged between two electrodes (123, 124).

13. Electrically actuated valve in accordance with claim 12, characterized in that the closure member (150) is biased by spring means (180) into a valve opening direction.

14. Electrically actuated valve in accordance with claim 13, characterized in that the closure member (150) is formed by a rotatable disk and the spring means (180) is formed by spiral spring.

15. Electrically actuated valve in accordance with claim 12, characterized in that means are provided to exclude rotation of the rotor (115) in one direction.

16. Eletrically actuated valve as in claim 13, characterized in that said means excluding rotation of the rotor (115) in said one direction is formed by said gear means (161, 162), which due to its transmission ratio excludes that said spring means (180) will rotate the rotor (115) in backward direction.

17. Electrically actuated valve as in claim 13, characterized in that said means excluding rotation of the rotor (115) in said one direction is formed by a one-way clutch.

18. Electrically actuated valve as in claim 12, characterized in that the electro-viscous clutch (170) is arranged in the force transmitting path extending between the gear means (161, 162) and the closure member (150).

19. Electrically actuated valve as in claim 12, characterized in that the electro-viscous coupling (117) includes a clutch wheel (119) rotatably arrange in a clutch chamber (121) of a clutch housing (171), which clutch chamber is filled with the electro-viscous liquid (122).

20. Electrically actuated valve in accordance with claim 19, characterized in that the transverse cross section of the clutch chamber (121) has a contour (174) being different from a circle.

21. Electrically actuated valve in accordance with claim 12, characterized in that manually operable latch means are provided to block movement of the closure element (150).

* * * * *